Dec. 26, 1939.         O. H. ERIKSEN         2,184,995
BUG DEFLECTOR
Filed May 25, 1938
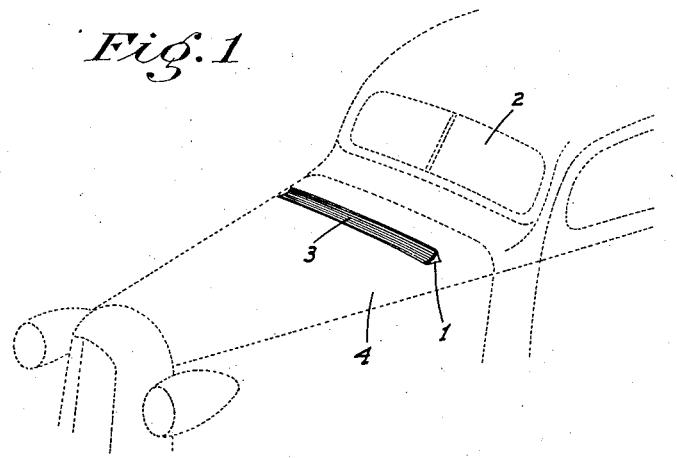
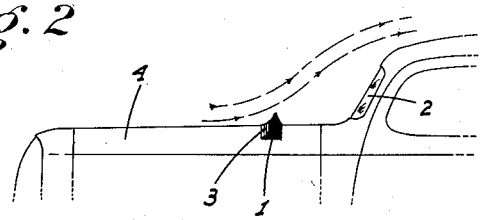
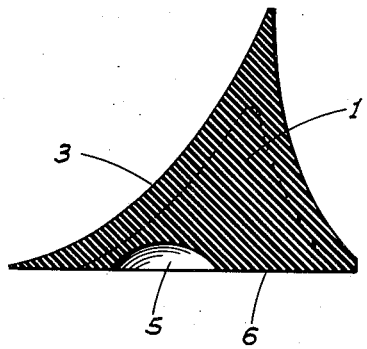
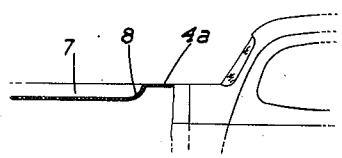
INVENTOR
O. H. Eriksen
BY
ATTORNEY Patented Dec. 26, 1939

2,184,995

UNITED STATES PATENT OFFICE 2,184,995

BUG DEFLECTOR

Oliver H. Eriksen, Chico, Calif.

Application May 25, 1938, Serial No. 209,957

1 Claim. (Cl. 296—91)

This invention relates generally to automotive equipment, and in particular the invention is directed to a deflector for motor vehicles which prevents bugs or other objects from striking the windshield.

The principal object of the invention is to provide a deflector for motor vehicles which is constructed and mounted so as to produce an upward air flow in front of the windshield whereby such air flow will deflect bugs or other objects away from the windshield and over the top of the vehicle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a perspective view of the preferred form of deflector as mounted on the hood of a vehicle.

Figure 2 is an end view of such deflector as mounted on a vehicle.

Figure 3 is a cross-section of the deflector shown in Figs. 1 and 2.

Figure 4 is a sectional elevation of a modified form of the invention as embodied in the hood of a motor vehicle.

Referring now more particularly to the characters of reference on the drawing, and at present to the preferred form of the invention as shown in Figs. 1-3 inclusive, the deflector comprises a member 1 which is of a length substantially equal to the width of the vehicle windshield 2.

The member is generally triangular in cross-section, as shown in Fig. 3, and the leading face 3 is concave and includes a predetermined loft for the purpose hereinafter described.

The member 1 is preferably made of rubber, and is mounted on the vehicle hood 4 transversely thereof and some distance ahead of the windshield 2. As the member is flexible, it conforms to the curvature of the hood and is held in place by suction cups 5 molded in the bottom surface 6 of said member. Other securing means may, however, be used.

When the deflector is so mounted and the vehicle is moving, the loft or pitch of face 3 forms an airfoil, which produces an upward air flow ahead of the windshield, such airflow deflecting bugs and other flying objects up and over the top of the vehicle before they can strike the windshield. While in the present embodiment, the hood is of the single piece type, the invention may be designed for split type hoods by separating member 1 into two sections.

The form of the invention shown in Fig. 4 functions in the same manner as above described, but instead of employing a separate member 1, the hood 4a is provided with a relatively wide trough 7 depressed therein and the rear end 8 of such trough is curved as shown, to provide the requisite loft or pitch to deflect the air flow upward ahead of the windshield.

From the foregoing description it will be readily seen that I have produced such a device as substantially fulfills the objects of the invention as set forth herein.

While this specification sets forth in detail the present and preferred constructon of the device, still in practice such deviations from such detail may be resorted to as do not form a departure from the spirit of the invention, as defined by the appended claim.

Having thus described my invention, what I claim as new and useful and desire to secure by Letters Patent is:

As an article of manufacture, a bug deflector for motor vehicles, said deflector comprising, in integral relation, an elongated body of flexible and resilient material, the body being adapted to extend transversely across and to be flexed to conform to the curvature of the hood of a motor vehicle at a point ahead of the windshield thereof, a leading face on the body having sufficient loft to deflect the air flow upward from ahead of the windshield, the body having a hood engaging base relatively wide transversely, and a plurality of longitudinally spaced suction cups formed in the body and opening downward through the base, said suction cups being adapted to secure the body on the hood of a motor vehicle and in conforming relation to the hood curvature.

OLIVER H. ERIKSEN.